Sept. 23, 1952     S. BECKWITH ET AL     2,611,797
DYNAMOELECTRIC MACHINE WITH RESILIENTLY SUPPORTED STATOR
Filed July 8, 1950

Inventors
Sterling Beckwith
William F. King
by T. Lloyd La Fave
Attorney

Patented Sept. 23, 1952

2,611,797

UNITED STATES PATENT OFFICE 2,611,797

DYNAMOELECTRIC MACHINE WITH RESILIENTLY SUPPORTED STATOR

Sterling Beckwith, Milwaukee, and William F. King, Wauwatosa, Wis., assignors to Allis-Chalmers Manufacturing Company, Milwaukee, Wis.

Application July 8, 1950, Serial No. 172,636

7 Claims. (Cl. 171—209)

This invention relates to improvements in dynamoelectric machines, and particularly to an arrangement for minimizing the effect on the housing and support therefor of distortions and vibrations produced by a rotating magnetic field and for magnetostrictive effect of the magnetic core in such machine.

In large dynamoelectric machines, such as two pole turbogenerators and synchronous motors or condensers, the magnetic force exerted between the rotor and stator cores is concentrated opposite the poles to produce local stresses in the cores. As a result the stator core is distorted elliptically, maximum distortion occurring in the core at a pair of diametrically opposite points which are drawn toward the rotor and at ninety electrical degrees thereof at another pair of diametrically opposite points which are forced away from the rotor. This elliptical distortion of the stator core rotates at the speed of rotation of the rotor to produce a vibration of the stator core and its supporting frame at a frequency equal to twice the speed of rotation. In machines having more than two poles, distortions of more complicated geometrical configuration take place for the same reason.

In this type of machine, vibrations produced by the deformation of the stator core may be minimized or substantially isolated from the housing and support for the machine by supporting the stator core in, and intermediate the ends of, a longitudinal frame. This frame is spaced from the enclosing housing and is supported therein only at the ends of the frame in rigid end members of the housing to provide a support for the core which is rigid longitudinally and laterally and flexible radially to elliptical and more complicated distortions. Magnetostriction of the core laminations, which relates to the stresses and dimension changes attending magnetization, will also produce stator core distortion and vibration which preferably should be isolated from the foundation and from the stator housing. This magnetostrictive effect will exist in machines of any speed, including low speed machines where magnetic air gap forces do not produce significant electromagnetic distortions.

It is therefore an object of this invention to provide an improved dynamoelectric machine in which vibrations of the stator core are substantially isolated from the enclosing housing.

Another object of this invention is to provide an improved dynamoelectric machine having its stator magnetic core mounted in a frame, in which the transmission of vibratory forces between the stator frame and the supporting housing of the machine is minimized.

Objects and advantages of this invention other than those stated above will be apparent from the following description when read in connection with the accompanying drawing in which.

Figure 2:
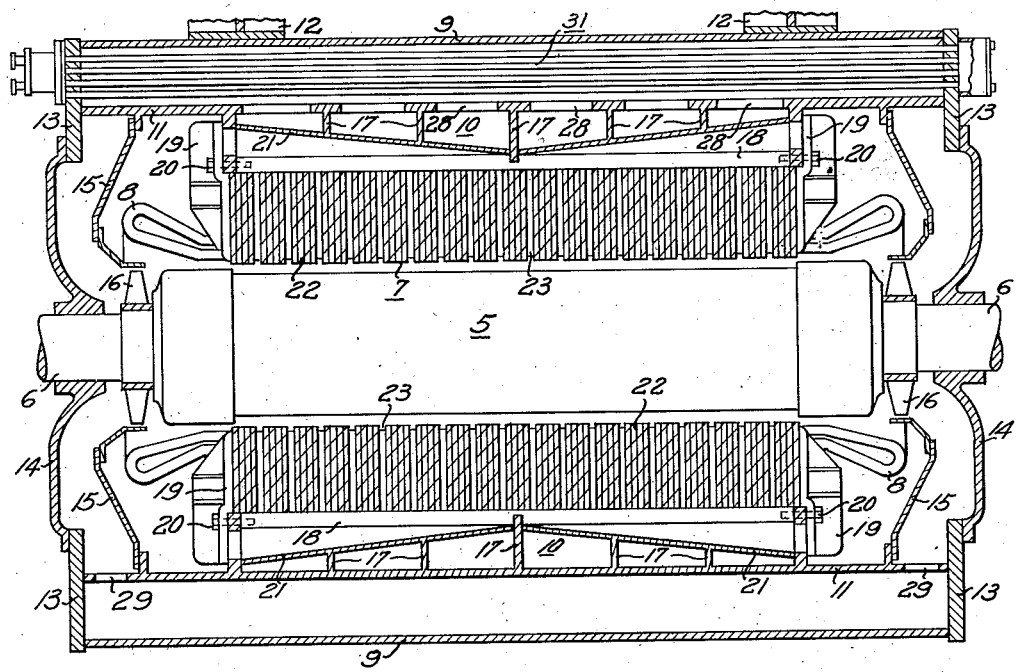
Fig. 2 is a view of the dynamoelectric machine of Fig. 1 taken along the broken line II—II.

Referring to the drawing, numeral 5 represents the rotor or rotating field member of a dynamoelectric machine of the hydrogen cooled or air cooled type. The rotor is of conventional form and comprises a shaft 6 supported by suitable bearings, not shown, and a magnetic core with an energizing winding in the peripheral portion thereof. The rotor reacts electrodynamically with the stator 7 which comprises an armature winding 8 supported in a laminated magnetic core mounted in a stationary support.

The stationary support comprises a cylindrical shell 9 which supports the stator core through the intermediary of a frame 10 spaced from the shell 9. The shell 9 is provided with feet 12 on each side thereof which are mounted on a supporting foundation, not shown. Radially rigid rings 13 are each welded to an end of the shell. End bells 14 are removably secured to the end rings and their central portions are provided with suitable shaft seals, not shown. The end bells 14, end rings 13, and shell 9 are so assembled as to form a totally enclosed housing for the machine.

Frame 10 supports the stator core in coaxial relation to the rotor. The frame comprises a structure which extends longitudinally of the core such as the cylindrical or tubular member 11 which has each of its ends welded to an end ring 13 to provide support for the core. The support is rigid tangentially to rotational forces and rigid longitudinally to axial forces but is resilient radially of the core. The end portions of the tubular member 11 are of sufficient length to gradually attenuate the deformations of the median portion due to radial vibrations of the core, so that only a small fraction of these vibrations are transmitted to the end rings 13 which rigidly support the ends of the tubular frame. Secured to each end portion of the tubular member 11 is a shield 15 of bell shaped cross section extending inwardly toward the rotor shaft, with its central portion extending axially inward to form a housing for a fan 16 on the rotor shaft. Frame 10 comprises radial support plates 17 secured to the inner side of the tubular member 11 intermediate the ends of the frame to support longitudinally extending bars 18 on which the laminations 22 of the stator core are assembled. These laminations are held in clamped position between clamping members 19. Adjustable nuts 20 bear against the clamping members 19 and engage threaded ends of the stud bolts which extend through openings in clamping members and engage threaded holes in the ends of the bars 18.

The frame 10 supporting the core includes supply ducts 21 for the ventilating gas. Ducts of the particular axial type shown are inserted in apertures in the radial plates and held in position thereby with the inner edges of the ducts secured to the longitudinal bars 18. These ducts, 21, are open at their ends to connect with the space axially adjacent the stator core, and the ducts are open on their radially inner side to connect with radial ventilating passages in the stator core.

The stator core laminations 22 are arranged in groups providing radial ventilating spaces 23 between groups of laminations. These spaces extend from the periphery of the core to the air gap and are divided into radial passages 24 and 25 by radially extending spacer elements 26 secured to one of the adjacent laminations. Passages 24 connect the ducts 21 with the air gap, and passages 25 connect the air gap with the space between adjacent ducts 21 and the frame 11.

The tubular member 11 has longitudinally spaced apertures 28 on diametrically opposite sides of the machine for the passage of ventilating gas from the space between the ducts 21 and the frame to the space between the frame and the shell 9.

While the housing will dissipate to the outside atmosphere a certain amount of heat absorbed from the circulated ventilating gas, the heat in the ventilating gas is almost entirely absorbed by the use of cooling units 31 of generally conventional type, extending throughout the full length of the shell 9 and disposed in the space between the shell 9 and the frame 10 in the path of the circumferential travel of the hydrogen.

In the particular construction shown in Fig. 2, two pairs of cooler units 31 are disposed on opposite sides of the machine, with one cooler unit on each side of each row of apertures 28 in the tubular member 11. Each cooler unit comprises a plurality of longitudinally extending tubes secured at the ends of the unit in tube sheets which are secured to a frame and to the end rings 13 in a conventional manner to prevent leakage of gas from the machine. For additionally supporting the cooler units throughout their length without any rigid contact with frame 10, longitudinally spaced brackets 32 are welded to the inner surface of the shell 9 to extend radially inward therefrom. Longitudinally extending ribs 34 of the frame of the cooler units are welded to the support brackets 32.

Figure 1:
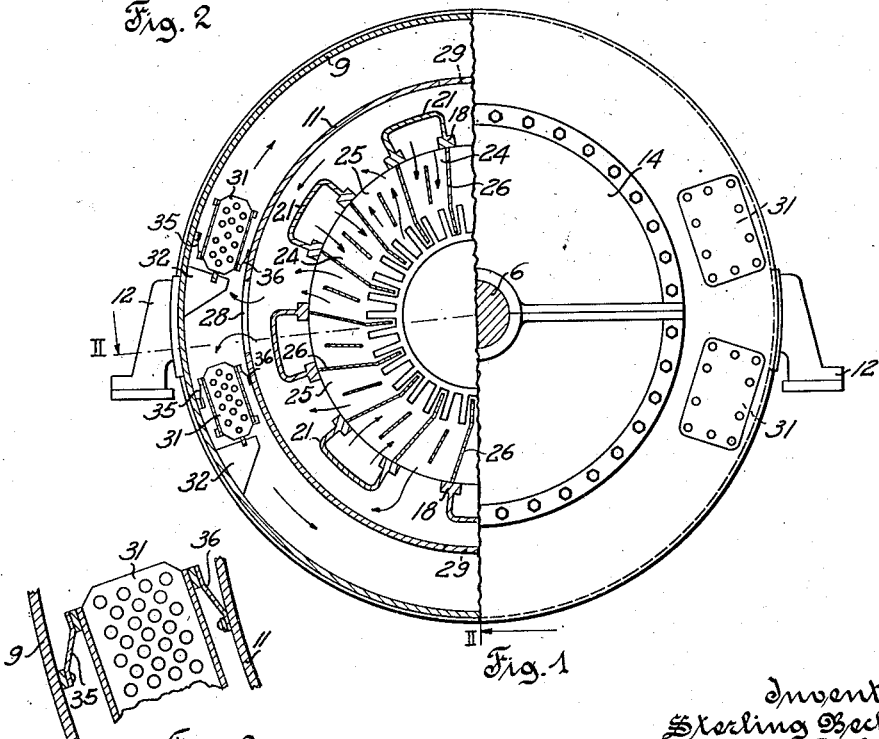
Fig. 1 is a view in elevation and partly in transverse cross section of a dynamoelectric machine embodying the invention.
Figure 3:
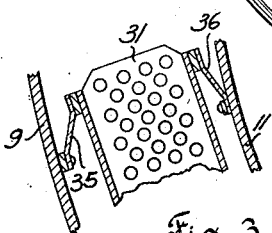
Fig. 3 is an enlarged view of a portion of the transverse cross section of Fig. 1.

To provide that substantially all of the ventilating gas traveling circumferentially in the space between the shell 9 and frame 10 will pass through the cooler units, longitudinally extending baffles 35, 36 are disposed on either side of the cooler units to prevent any gas bypassing the cooler units. One longitudinal edge portion of each of the baffles 35 is secured to the shell 9 and its other longitudinal edge portion throughout its length may have a small clearance with the adjacent surface of a cooler unit, but it preferably contacts the adjacent surface of the cooler unit, as shown in Figs. 1 and 3. Similarly each of the baffles 36 is secured to the frame 10 and extends to the associated cooler unit so that its free edge may just clear but preferably contacts the adjacent surface of the cooler unit. Baffles 36, of which one is shown on an enlarged scale in Fig. 3, are made of suitable resilient material such as steel or phosphor bronze. They are preferably so formed that their free edges are resiliently applied against the cooler units. In this manner, each baffle 36 is constantly in contact with the associated cooler unit, although the cooler unit is fixedly supported by shell 9 while the stator core 7 and supporting frame 10 undergo radial distortion due to the magnetic forces acting between the cores 5 and 7.

This arrangement of a frame 10 for supporting the laminated stator core 7 within an enclosing housing provides support which is very rigid to resist torque or translational forces (gravitational or off-center air gap forces), but is relatively flexible to radial forces resulting from the presence of definite magnetic poles or from magnetostriction. Consequently very little core vibration is transmitted to the cooler units or to the supporting shell and foundation.

With the machine in normal operation, the fans 16 draw ventilating gas axially inward from the spaces between the end bells 14 and the end shields 15. This gas is forced by the fans to pass radially outward over the end turns of windings 8 and axially through the ducts 21, thence inward through radial passages 24 in the stator core to the air gap and circumferentially therein to radial passages 25 and thence outward through these passages 25. The gas passes outward from the core to the spaces adjacent the ducts 21, thence circumferentially about the core and ducts through frame 10 to apertures 28 to the space between the frame and shell, where the gas may travel in either direction circumferentially for a distance. It is in this path of circumferential travel of the gas that the longitudinally extending cooler units 31 are located. After passing through the cooler units the gas travels axially to the ends of the machine where it passes radially through the end portions of the tubular member 11 via apertures 29 situated ninety degrees from the apertures 28. The apertures 29 communicate with the spaces between the end bells 14 and the end shields 15, whence the gas is recirculated as described above. The path of the ventilating gas in the machine is indicated by arrows in the drawing.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. A gas cooled dynamoelectric machine comprising a shell having rigid radially disposed end rings secured to the ends thereof, a laminated armature core subjected to radial vibrations by the magnetic field rotating with respect thereto, a frame of generally tubular configuration with said core secured radially therein intermediate the ends of said frame, said frame being rigid longitudinally and flexible radially of said core, means for supporting said frame within said shell and for isolating radial vibrations of said core from said shell, said means comprising said ends of said frame secured to said end rings to space apart said shell and said frame, a cooler disposed and supported on said shell independently of said frame, means for circulating ventilating gas in said machine and through said cooler, and a baffle disposed between said cooler and said frame to prevent said gas bypassing said cooler, said baffle being radially resilient so that vibrations of said core are not transmitted to said cooler and said shell.

2. A dynamoelectric machine comprising a shell enclosure, radially rigid end rings secured to said shell, a frame of generally tubular configuration spaced from said shell and having longitudinally extending end portions rigidly secured in said end rings to provide the only support for said frame, said frame comprising circumferentially spaced and axially extending ducts, a laminated armature core subjected to radial vibrations by the magnetic field rotating with respect thereto rigidly secured in said frame intermediate the end portions thereof, said core provided with radial ventilating spaces between adjacent groups of laminations which spaces connect with said axially extending ducts, said frame being rigid longitudinally and flexible radially of said core for providing support for said core which is flexible to radial forces.

3. A gas cooled dynamoelectric machine comprising a cylindrical shell having rigid end rings secured to the ends thereof, a laminated armature core subjected to radial vibrations by the magnetic field rotating with respect thereto, a frame which is rigid longitudinally and flexible radially of said core, said frame comprising a tubular member with said core secured radially therein intermediate the ends of said member, means supporting said member to isolate radial vibrations of said core from said shell, said means comprising said end rings secured to said ends of said member to space apart said shell and said member and to support said core, a cooler mounted on said shell independently of said frame between said shell and said frame and longitudinally and radially outward of said core, means for circulating ventilating gas in said machine and circumferentially through said cooler, and a baffle mounted longitudinally on said frame between said frame and said cooler to prevent said gas bypassing said cooler, said baffle being radially resilient so that vibrations of said core are not transmitted to said cooler and said shell.

4. A two pole dynamoelectric machine comprising a gas tight closed housing, said housing comprising a shell with radially rigid end rings secured to the ends of said shell, an armature core subjected to periodic radial deformation by the magnetic field rotating with respect thereto, and a frame including a tubular member of substantially uniform diameter radially supporting said core therein intermediate the ends of said frame, said tubular member being spaced from said shell, said end rings being integrally joined to the ends of said tubular member to form the only support for said frame, said tubular member being inherently rigid to forces tangential to said member and flexible intermediate the ends thereof to forces normal thereto so that said frame provides support for said core which is rigid to translational and torque forces and flexible to radial forces applied to said core, said housing preventing the transmission to atmosphere of the noise-producing vibrations imparted to the gas contained therein by said periodic deformation of said core.

5. A two pole dynamoelectric machine comprising a gas tight closed housing, said housing comprising a shell and radially rigid end rings secured to the ends of said shell, a laminated armature core subjected to radial vibrations by the two pole magnetic field rotating with respect thereto, and a frame including a tubular member of substantially uniform diameter with said core radially secured therein, said member having ends which extend longitudinally of said core and are welded to said rings to provide the only support for said member and to space said member from said shell, said member being inherently rigid longitudinally thereof and flexible radially intermediate said ends of said member and said ends being rigid radially thereof, whereby said member provides support for said core which is rigid to translational and torque forces and flexible to radial forces to cause said radial vibrations of said core to be attenuated in said member and isolated from said housing, said housing confining the noise-producing vibrations imparted to the gas contained therein by said radial vibrations of said core.

6. A two pole dynamoelectric machine comprising a gas tight closed housing, said housing comprising a shell with radially rigid end rings secured to the ends thereof, rigid feet integrally secured to said housing for supporting said machine, a laminated armature core subjected to radial distortions and vibrations by the two pole magnetic field rotating with respect to said armature, and a frame including a tubular member of substantially uniform diameter with said core radially secured therein, said member having ends which extend longitudinally of said core and are welded to said rings to provide the only support for said member and to space said member from said shell, said member being inherently rigid longitudinally thereof and flexible radially intermediate its said ends which are rigid radially thereof, whereby said member provides support for said core which is rigid to translational and torque forces and flexible to radial forces to cause said radial distortions and vibrations to be confined within said machine and to be attenuated in said member and isolated from said shell and said feet.

7. A two pole dynamoelectric machine comprising a gas tight closed housing, said housing comprising a cylindrical shell with radially rigid end rings secured thereto, a frame of generally tubular configuration spaced from said shell, an armature core subjected to radial vibrations by the two pole magnetic field rotating with respect thereto secured radially within said frame, said frame being rigid longitudinally and flexible radially of said core and having ends extending longitudinally of said core, said ends of said frame being integrally secured to said end rings to provide the only support for said frame, said frame providing radially flexible support for said core within said housing to isolate said vibrations from said housing.

STERLING BECKWITH.
WILLIAM F. KING.

(References on following page)

REFERENCES CITED

The following references are of record in the file of this patent:

UNITED STATES PATENTS

| Number | Name | Date |
|---|---|---|
| 1,906,849 | Fleischmann | May 2, 1933 |
| 1,908,620 | Zorzi | May 9, 1933 |
| 2,196,408 | Baudry | Apr. 9, 1940 |
| 2,297,988 | Sawyer | Oct. 6, 1942 |
| 2,338,593 | Mortensen | Jan. 4, 1944 |
| 2,372,135 | Sterrett | Mar. 20, 1945 |
| 2,523,520 | Reinhard | Sept. 26, 1950 |

FOREIGN PATENTS

| Number | Country | Date |
|---|---|---|
| 95,745 | Switzerland | Aug. 1, 1922 |